United States Patent
Okutoh

(10) Patent No.: US 6,177,209 B1
(45) Date of Patent: Jan. 23, 2001

(54) BATTERY PROTECTOR HAVING A POSITIVE TEMPERATURE COEFFICIENT ELEMENT

(75) Inventor: Tadashi Okutoh, Kawasaki (JP)

(73) Assignee: Nippon Moli Energy Corp., Yokohama (JP)

(*) Notice: Under 35 U.S.C. 154(b), the term of this patent shall be extended for 0 days.

(21) Appl. No.: 09/126,425

(22) Filed: Jul. 30, 1998

(30) Foreign Application Priority Data

Jul. 31, 1997 (JP) .................................... 9-206148

(51) Int. Cl.[7] .......................... H01M 2/00; H01M 10/50; H01M 10/48
(52) U.S. Cl. .................... 429/62; 429/92; 429/7
(58) Field of Search .................. 429/61, 62, 91, 429/7, 92

(56) References Cited

U.S. PATENT DOCUMENTS

| | | | |
|---|---|---|---|
| 5,609,972 | * 3/1997 | Kaschmitter et al. | 429/56 |
| 5,631,100 | * 5/1997 | Yoshino et al. | 429/62 |
| 5,689,173 | * 11/1997 | Oosaki et al. | 320/35 |
| 5,939,217 | * 8/1999 | Tamura et al. | 429/7 |

* cited by examiner

Primary Examiner—Stephen Kalafut
Assistant Examiner—Tracy Dove
(74) Attorney, Agent, or Firm—Armstrong, Westerman, Hattori, McLeland & Naughton

(57) ABSTRACT

A small protector is provided for a high energy density battery such as a lithium ion battery. A flat sheet form of leading portion extending from a positive temperature coefficient element is provided thereon with at least one battery protecting circuit element for detecting at least one abnormality selected from overcharging, over-discharging, overcurrent, and unusual temperature to cut off a current passing therethrough. A fail-safe mechanism is achieved for the actuation of the positive temperature coefficient element and the actuation of the battery protecting circuit element.

8 Claims, 1 Drawing Sheet

(A)

(B)

BATTERY PROTECTOR HAVING A POSITIVE TEMPERATURE COEFFICIENT ELEMENT

BACKGROUND OF THE INVENTION

The present invention relates generally to a protector for secondary batteries, and particularly to a protector for a specific secondary battery of high energy density, e.g., a lithium ion battery using a lithium ion doping or de-doping material as an active negative electrode material. More particularly, the present invention is directed to a battery protector of small size.

A lithium ion battery using a lithium ion doping or de-doping carbonaceous material can output high voltage and has high energy density albeit being light in weight, and so is now widely used on portable equipment. Although secondary batteries may be used over and over by charging, yet their performance may become worse upon charging. Especially in the case of a lithium ion battery, an overcharge preventing protector is incorporated therein so as to prevent overcharging which may otherwise cause precipitation of metallic lithium or an electrolyte leakage due to the actuation of a pressure valve due to gas generation upon overcharging, resulting in thermal runaway, and fuming. In addition, an over-discharge protector, a current limiter, a device for preventing a battery temperature increase during charging and discharging are provided.

Equipment using batteries as a power source may operate with batteries having different capacities and a different number of batteries depending on what purpose it is used for. Used for this reason is a battery pack which is attachable to or detachable from equipment and contains one or more batteries.

A battery protector should be regulated for each battery capacity, and so is built in the battery pack. This is also true of a positive temperature coefficient element (PTC) that can be actuated by heat generated by an overcurrent due to short-circuiting or a battery temperature increase to cut off a current passing therethrough, because it should be located in the vicinity of a battery.

Small yet large-capacity batteries are required for size reductions of equipment using batteries as a power source. However, a battery protector is built in an individual battery pack. This, combined with the size limitation of the battery pack, is one factor of a reduction in the amount of active battery materials.

The present invention is directed to a protector for a secondary battery having high energy density such as a lithium ion battery using a lithium ion doping or de-doping carbonaceous material as an active negative electrode material. A particular object of the invention is to provide a battery protector of small size.

SUMMARY OF THE INVENTION

The present invention provides a battery protector having a positive temperature coefficient element, wherein:

a flat sheet form of leading portion extending from said positive temperature coefficient element is provided thereon with at least one battery protecting circuit element for detecting at least one abnormality selected from overcharging, over-discharging, overcurrent, and unusual temperature to cut off a current passing therethrough.

Preferably, the battery protecting circuit element is mounted on the flat sheet form of leading portion extending from the positive temperature coefficient element while the battery protecting circuit element is provided on a circuit substrate.

Preferably, the battery protecting circuit element and the flat sheet form of leading portion extending from the positive temperature coefficient element are thermally coupled together via a heat radiating sheet.

Preferably, the unusual temperature is sensed by a temperature sensor element located in the vicinity of the positive temperature coefficient element, or found from a voltage drop across the positive temperature coefficient element.

DESCRIPTION OF THE PREFERRED EMBODIMENT

In the battery protector having a positive temperature coefficient element according to the invention, the positive temperature coefficient element is integral with a substrate comprising a battery protecting circuit for protecting a battery against overcharging, over-discharging, overcurrents, temperature increases, etc.

In a positive temperature coefficient element, generally, a leading portion thereof is formed of a conductor having a large area, such as a nickel sheet, so as to prevent a voltage drop due to a current passing therethrough. In the present invention, a flat sheet form of leading portion is designed to extend from the positive temperature coefficient element.

The present invention is now explained with reference to FIGS. 1(A) and 1(B).

Figure 1:
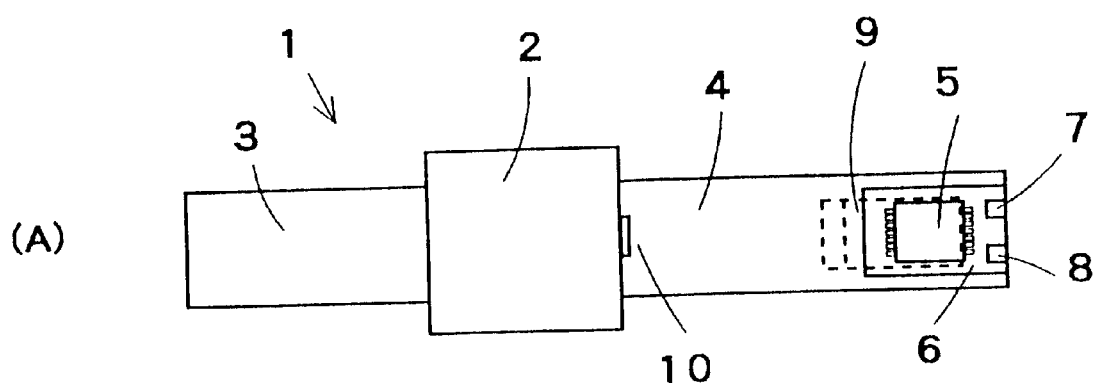
FIGS. 1(A) and 1(B) are illustrative of one embodiment of the battery protector having a positive temperature coefficient element according to the invention.
Figure 1:
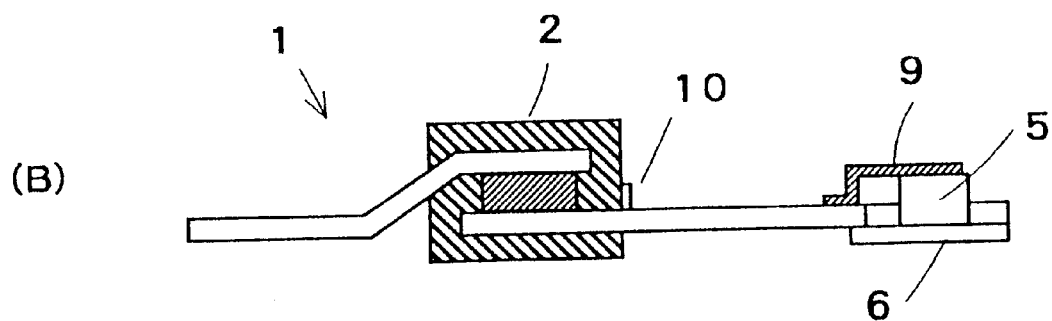

FIGS. 1(A) and 1(B) are a plan view and a sectional view of one embodiment of the battery protector having a positive temperature coefficient element according to the invention, respectively.

A battery protector 1 comprises a positive temperature coefficient element 2 from which leading portions 3 and 4, each in a flat plate form, extend. The leading portion 4 is provided with a circuit substrate 6 having a battery protecting circuit element 5, and makes an electrical connection with the circuit substrate 6. The circuit substrate 6 is provided with a terminal 7 for connection to a battery (batteries) and equipment, and a ground terminal 8. The circuit substrate 6 also comprises a heat radiating sheet 9 for thermally coupling the battery protecting circuit element 5 to the leading portion, as shown by a broken line in FIG. 1(A). A temperature sensor element 10 is located in the vicinity of the positive temperature coefficient element 2.

With the battery protector 1 positioned in place, either one of the leading portion 3 and the connecting terminal 7 of the circuit substrate 6 is connected to a positive-side terminal of the battery, and the ground terminal 8 is connected to a ground-side wiring. The positive temperature coefficient element 2 is positioned in the vicinity of the battery so that, when the battery generates heat, the heat can be well transmitted thereto.

When the battery is in normal operation, heat generated by a current in the battery protecting circuit element 5 is radiated from the heat radiating sheet 9 and the leading portion thermally coupled thereto.

When an excessive current passes through the battery by reason of short-circuiting, etc., the positive temperature coefficient element 2 generates heat and increases in resistance, so that the current passing therethrough can be controlled. It is preferable to sense the temperature of the positive temperature coefficient element 2 by means of the temperature sensor element 10. When the temperature of the element 2 is found to exceed a preset temperature, a current cutoff circuit in the battery protecting circuit element is actuated to cut off the current passing therethrough.

Instead of sensing the temperature increase of the positive temperature coefficient element by the temperature sensor element, it is also acceptable to find the temperature inherent in the positive temperature coefficient element from the voltage across the positive temperature coefficient element and the magnitude of the current passing therethrough. If the found temperature exceeds a preset temperature, the current cutoff circuit in the battery protecting circuit element 5 is then actuated.

Thus, the battery protector of the invention has a fail-safe mechanism for cutting off the current in response to an increase in the resistance of the positive temperature coefficient element, and for cutting off the current by the actuation of the current cutoff circuit in the battery protecting circuit element. Consequently, it is possible to protect the battery with great reliability.

With the present invention where the positive temperature coefficient element increasing in electrical resistance due to the generation of heat by an excessive current is integral with the battery protecting circuit element, it is possible to reduce the size of a battery pack and, hence, increase capacity per volume of the battery pack.

What we claim is:

1. A battery protector comprising:

a positive temperature coefficient element;

a flat sheet form of leading portion extending from said positive temperature coefficient element;

at least one battery protecting circuit element provided on said flat sheet form of leading portion, electrically connected in series with said positive temperature coefficient element, for cutting off a current passing therethrough detecting at least one abnormality of overcharging, over-discharging, overcurrent, and unusual temperature.

2. The battery protector according to claim 1, wherein said battery protecting circuit element is mounted on said flat sheet form of leading portion extending from said positive temperature coefficient element while said battery protecting circuit element is provided on a circuit substrate.

3. The battery protector according to claim 1, wherein said battery protecting circuit element and said flat sheet form of leading portion extending from said positive temperature coefficient element are thermally coupled together via a heat radiating sheet.

4. The battery protector according to claim 2, wherein said battery protecting circuit element and said flat sheet form of leading portion extending from said positive temperature coefficient element are thermally coupled together via a heat radiating sheet.

5. The battery protector according to claim 1, wherein said unusual temperature is sensed by a temperature sensor element located in the vicinity of said positive temperature coefficient element, or found from a voltage drop across said positive temperature coefficient element.

6. The battery protector according to claim 2, wherein said unusual temperature is sensed by a temperature sensor element located in the vicinity of said positive temperature coefficient element, or found from a voltage drop across said positive temperature coefficient element.

7. The battery protector according to claim 3, wherein said unusual temperature is sensed by a temperature sensor element located in the vicinity of said positive temperature coefficient element, or found from a voltage drop across said positive temperature coefficient element.

8. The battery protector according to claim 4, wherein said unusual temperature is sensed by a temperature sensor element located in the vicinity of said positive temperature coefficient element, or found from a voltage drop across said positive temperature coefficient element.

* * * * *